(12) United States Patent
Lin et al.

(10) Patent No.: US 9,984,440 B2
(45) Date of Patent: May 29, 2018

(54) ITERATIVE PATCH-BASED IMAGE UPSCALING

(71) Applicant: Adobe Systems Incorporated, San Jose, CA (US)

(72) Inventors: Zhe Lin, Fremont, CA (US); Jianchao Yang, San Jose, CA (US); Scott D. Cohen, Sunnyvale, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 195 days.

(21) Appl. No.: 13/920,957

(22) Filed: Jun. 18, 2013

(65) Prior Publication Data

US 2014/0368509 A1 Dec. 18, 2014

(51) Int. Cl.
| | |
|---|---|
| *G09G 5/00* | (2006.01) |
| *G06T 3/40* | (2006.01) |
| *G06K 9/32* | (2006.01) |
| *G06T 5/00* | (2006.01) |

(52) U.S. Cl.
CPC .............. *G06T 3/40* (2013.01); *G06T 3/4053* (2013.01); *G06T 3/4076* (2013.01); *G06T 5/002* (2013.01); *G06T 5/003* (2013.01); *G06T 2207/20012* (2013.01); *G09G 2340/0407* (2013.01)

(58) Field of Classification Search
CPC ......... G06T 3/4053; G06T 3/40; G06T 5/003; G06T 3/4076; G06T 5/002; G06T 2340/0407; G06T 2207/20012
USPC .................. 382/299, 298, 282, 284; 345/660
See application file for complete search history.

(56) References Cited

U.S. PATENT DOCUMENTS

| | | | |
|---|---|---|---|
| 6,563,893 B2 | 5/2003 | Smith et al. |
| 7,116,841 B2 | 10/2006 | Wright |
| 7,623,574 B2 | 11/2009 | Holcomb |
| 7,941,004 B2 | 5/2011 | Zhu et al. |
| 8,009,921 B2 | 8/2011 | Csurka |

(Continued)

OTHER PUBLICATIONS

Y. HaCohen, et al., "Image Upsampling via Texture Hallucination", 2010 IEEE International Conference on Computational Photography (ICCP), Mar. 29-30, 2010, p. 1-8.*

(Continued)

*Primary Examiner* — Jin-Cheng Wang
(74) *Attorney, Agent, or Firm* — Wolfe-SBMC (57) ABSTRACT

Image upscaling techniques are described. These techniques may include use of iterative and adjustment upscaling techniques to upscale an input image. A variety of functionality may be incorporated as part of these techniques, examples of which include content-adaptive patch finding techniques that may be employed to give preference to an in-place patch to minimize structure distortion. In another example, content metric techniques may be employed to assign weights for combining patches. In a further example, algorithm parameters may be adapted with respect to algorithm iterations, which may be performed to increase efficiency of computing device resource utilization and speed of performance. For instance, algorithm parameters may be adapted to enforce a minimum and/or maximum number to iterations, cease iterations for image sizes over a threshold amount, set sampling step sizes for patches, employ techniques based on color channels (which may include independence and joint processing techniques), and so on.

20 Claims, 10 Drawing Sheets

(56) References Cited

U.S. PATENT DOCUMENTS

| | | | |
|---|---|---|---|
| 8,085,280 | B2 | 12/2011 | Brichter et al. |
| 8,355,592 | B1 | 1/2013 | Shechtman et al. |
| 8,538,201 | B2 | 9/2013 | Damkat |
| 8,620,073 | B2 | 12/2013 | Tuzel et al. |
| 8,655,109 | B2 | 2/2014 | Lin et al. |
| 8,675,999 | B1* | 3/2014 | Liang et al. ............... 382/299 |
| 8,687,923 | B2 | 4/2014 | Lin et al. |
| 8,731,337 | B2 | 5/2014 | Lin et al. |
| 8,917,948 | B2* | 12/2014 | Jin et al. ............... 382/254 |
| 9,123,138 | B2 | 9/2015 | Fremont et al. |
| 9,225,889 | B1* | 12/2015 | Korkin ............... H04N 5/2258 |
| 2008/0001962 | A1* | 1/2008 | Lefebvre ............... G06T 3/0081 345/582 |
| 2012/0086850 | A1* | 4/2012 | Irani ............... G06T 3/4053 348/441 |
| 2012/0320228 | A1 | 12/2012 | Imade |
| 2013/0028538 | A1 | 1/2013 | Simske et al. |
| 2013/0034299 | A1 | 2/2013 | Lin |
| 2013/0034311 | A1 | 2/2013 | Lin |
| 2013/0034313 | A1* | 2/2013 | Lin et al. ............... 382/299 |
| 2013/0038758 | A1 | 2/2013 | Imade |
| 2013/0051685 | A1* | 2/2013 | Shechtman et al. ............... 382/218 |
| 2013/0064472 | A1 | 3/2013 | Zhang et al. |
| 2013/0071041 | A1* | 3/2013 | Jin et al. ............... 382/254 |
| 2013/0223734 | A1* | 8/2013 | Tuzel et al. ............... 382/167 |
| 2013/0294495 | A1* | 11/2013 | Rossato ............... H04N 19/105 375/240.01 |
| 2013/0301933 | A1* | 11/2013 | Salvador et al. ............... 382/205 |
| 2014/0368549 | A1 | 12/2014 | Lin et al. |
| 2015/0093045 | A1* | 4/2015 | Turkan ............... G06T 3/4053 382/299 |

OTHER PUBLICATIONS

V. Kwatra, et al., "Texture Optimization for Example-based Synthesis", ACM Trans. Graph., vol. 24, No. 3, 2005, p. 795-802.*

Buades, et al., "A non-local algorithm for image denoising", Retrieved from <http://bengal.missouri.edu/~kes25c/nl2.pdf > on Nov. 28, 2012, (2005), 6 pages.

Chang, Hong et al., "Super-Resolution through Neighbor Embedding", Computer Vision and Pattern Recognition, 2004. CVPR 2004. Proceedings of the 2004 IEEE Computer Society Conference, (Jul. 2004), 8 pages.

Dai, et al., "Soft Edge Smoothness Prior for Alpha Channel Super Resolution", CVPR, pp. 1-8, 2007., (2007), 8 pages.

Ebrahimi, Mehran et al., "Solving the Inverse Problem of Image Zooming Using "Self-Examples"", International Conference on Image Analysis and Recognition, (2007), 12 pages.

Fattal, Raanan "Image Upsampling via Imposed Edge Statistics", ACM Transactions on Graphics, 26(3), (2007), 8 pages.

Freedman, et al., "Image and Video Upscaling from Local Self-Examples", ACM Transactions on Graphics, vol. 30 Issue 2, (Apr. 2011), 11 pages.

Freeman, William T., et al., "Example-Based Super-Resolution", Computer Graphics and Applications, IEEE 22, 2(Mar./Apr.), (Dec. 2001), 14 pages.

Freeman, William T., et al., "Learning Low-Level Vision", International Journal of Computer Vision 40, (2000), 47 pages.

Glasner, et al., "Super-Resolution from a Single Image", Super-Resolution form a Single Image, (Oct. 20, 2009), 8 pages.

Morelle, Rebecca "From mortal to model", BBC News, (Aug. 16, 2006), 3 pages.

Sun, et al., "Image Hallucination with Primal Sketch Priors", Retrieved from <http://www.google.com/url?sa=t&rct=j&g=&esrc=s&source=web&cd=1&ved=0CDUQFjAA&url=http%3A%2F%2Fciteseerx.ist.psu.edu%2Fviewdoc%2Fdownload%3Fdoi%3D10.1.1.83.3473%26rep%3Drep1%26type%3Dpdf&ei=Mzq1UJCBNYeCjAKM-YCADA&usg=AFQjCNEFVscHa2GKU0OEr9rg, (2003), 8 pages.

Sun, Jian et al., "Image Super-Resolution Using Gradient Profile Prior", Proceedings of CVPR 2008, (2008), 8 pages.

Yang, et al., "Image Super-Resolution as Sparse Representation of Raw Image Patches", Retrieved from <http://www.ifp.illinois.edu/~jyang29/papers/CVPR08-SR.pdf> on Nov. 28, 2012, IEEE Conference on Computer Vision and Pattern Recognition,(2008), 8 pages.

Yang, Jianchao "Image Super-Resolution via Sparse Representation", IEEE Transactions on Image Processing, 19 (11), (2010), 51 pages.

Zhu, et al., "Automatic Parameter Selection for Denoising Algorithms Using a No-Reference Measure of Image Content", IEEE Transactions on Image Processing, vol. 19, No. 12, (Dec. 2010), pp. 3116-3132.

Zontak, Maria et al., "Internal Statistics of a Single Natural Image", IEEE Computer Society Conference on Computer Vision and Pattern Recognition, (2011), pp. 977-984.

"Non-Final Office Action", U.S. Appl. No. 13/565,411, (dated Sep. 25, 2013), 6 pages.

"Non-Final Office Action", U.S. Appl. No. 13/565,379, (dated Oct. 3, 2013), 6 pages.

"Notice of Allowance", U.S. Appl. No. 13/565,334, (dated Oct. 18, 2013), 8 pages.

"Restriction Requirement", U.S. Appl. No. 13/920,911, dated Dec. 15, 2014, 7 pages.

"Notice of Allowance", U.S. Appl. No. 13/565,379, dated Jan. 10, 2014, 7 pages.

"Notice of Allowance", U.S. Appl. No. 13/565,411, dated Jan. 14, 2014, 8 pages.

Liu, et al.,' "A High-Quality Video Denoising Algorithm based on Reliable Motion Estimation", European Conference on Computer Vision, 2010., Sep. 5, 2010, pp. 706-719.

Yang, et al.,' "Fast Image Super-resolution Based on In-place Example Regression", (2013) IEEE CVPR., 2013, 8 pages.

"Non-Final Office Action", U.S. Appl. No. 13/920,911, dated Apr. 24, 2015, 9 pages.

"Notice of Allowance", U.S. Appl. No. 13/920,911, dated May 29, 2015, 8 pages.

* cited by examiner

402
Upscale an input image by a scale factor to generate an upscaled input image

404
Smooth the input image to generate a smoothed input image

406
Generate an upscaled image iteration

408
Identify which of a plurality of patches in the smoothed input image is most similar to the patch in the upscaled input image

410
Compute a prediction for the patch in the upscaled input image using the most similar patch from the smoothed input image and a corresponding patch from the input image

412
Form a prediction of a patch for the upscaled image iteration using the prediction for the patch in the upscaled image and the patch in the upscaled image

802
Identify which of a plurality of patches in a neighborhood of a location in an image is most similar to a patch in an upscaled input image

804
Compute a content metric for the identified patch based on content included within the identified patch

806
Compute a content metric for a patch at the location in the image based on content included within the patch

808
Assign weights to the identified patch and the patch at the location in the image based on respective content metrics

810
Combine the identified patch and the patch at the location using the assigned weights to generate a patch to be used as a prediction to generate an upscaled image

ITERATIVE PATCH-BASED IMAGE UPSCALING

BACKGROUND

Image scaling may be used to resize an image, such as an image captured by an image capture device included in a user's phone, stand-alone camera, or even an image created by a user using image editing software. This may include upscaling an image to increase a number of pixels used to represent the image. Likewise, downscaling may involve reducing a number of pixels used to represent an image.

Upscaling an image, however, may involve a trade-off between a variety of different factors, such as smoothness and sharpness. As the size of an image is increased, for instance, pixels used to represent the image may have increased visibility and therefore lose the smoothness and sharpness that are apparent to the image before upscaling. Conventional techniques that are utilized to address these problems, however, may result in blurred image edges and textures and therefore generate a result that is undesirable to the user.

SUMMARY

Image scaling techniques are described. These techniques may include use of iterative and adjustment upscaling techniques to upscale an input image. A variety of functionality may be incorporated as part of these techniques, examples of which include content-adaptive patch finding techniques that may be employed to give preference to an in-place patch to minimize structure distortion. In another example, content metric techniques may be employed to assign weights for combining patches. In a further example, algorithm parameters may be adapted with respect to algorithm iterations, which may be performed to increase efficiency of computing device resource utilization and speed of performance. For instance, algorithm parameters may be adapted to enforce a minimum and/or maximum number to iterations, cease iterations for image sizes over a threshold amount, set sampling step sizes for patches, employ techniques based on color channels (which may include independence and joint processing techniques), and so on.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Conventional techniques utilized to upscale an image typically assumed a smoothness in an up-sampled result. Consequently, these conventional techniques could result in blurred image edges and textures in the upscaled image, which could make the upscaled image undesirable for its intended purpose.

Techniques are described in which an image may be upscaled yet still preserve image edge and texture details. For example, techniques may be employed to iteratively upscale an input image by a set scale factor (e.g., 1.5-2) at each iteration until the desired magnification factor is reached, which may also involve adjustment to arrive at a final desired upscale amount. These techniques may include use of Bicubic interpolation and Gaussian smoothing for finding example patches, adaptive patch processing, and patch regression, further discussion of which may be found in relation to FIGS. 2-4.

The techniques used to perform the iterative upscale may employ a variety of different functionality. For example, content-adaptive patch finding techniques may be employed to give preference to an in-place patch to minimize structure distortion, further discussion of which may be found in relation to the Content-Adaptive Patch Finding Section and FIGS. 5 and 6. In another example, content metric techniques may be employed to assign weights for combining patches, further discussion of which may be found in relation to the Content-Adaptive Patch Update Section and FIGS. 7 and 8. In a further example, algorithm parameters may be adapted with respect to algorithm iterations, which may be performed to increase efficiency of computing device resource utilization and speed of performance. For instance, algorithm parameters may be adapted to enforce a minimum and/or maximum number to iterations, cease iterations for image sizes over a threshold amount, set sampling step sizes for patches, employ techniques based on color channels (which may include independence and joint processing techniques), and so on as further described in the Iteration-Adaptive Parameter Update Section.

In the following discussion, an example environment is first described that may employ the techniques described herein. Example techniques are then described which may be performed in the example environment as well as other environments. Consequently, performance of the example techniques is not limited to the example environment and the example environment is not limited to performance of the example techniques.

Example Environment

Figure 1:
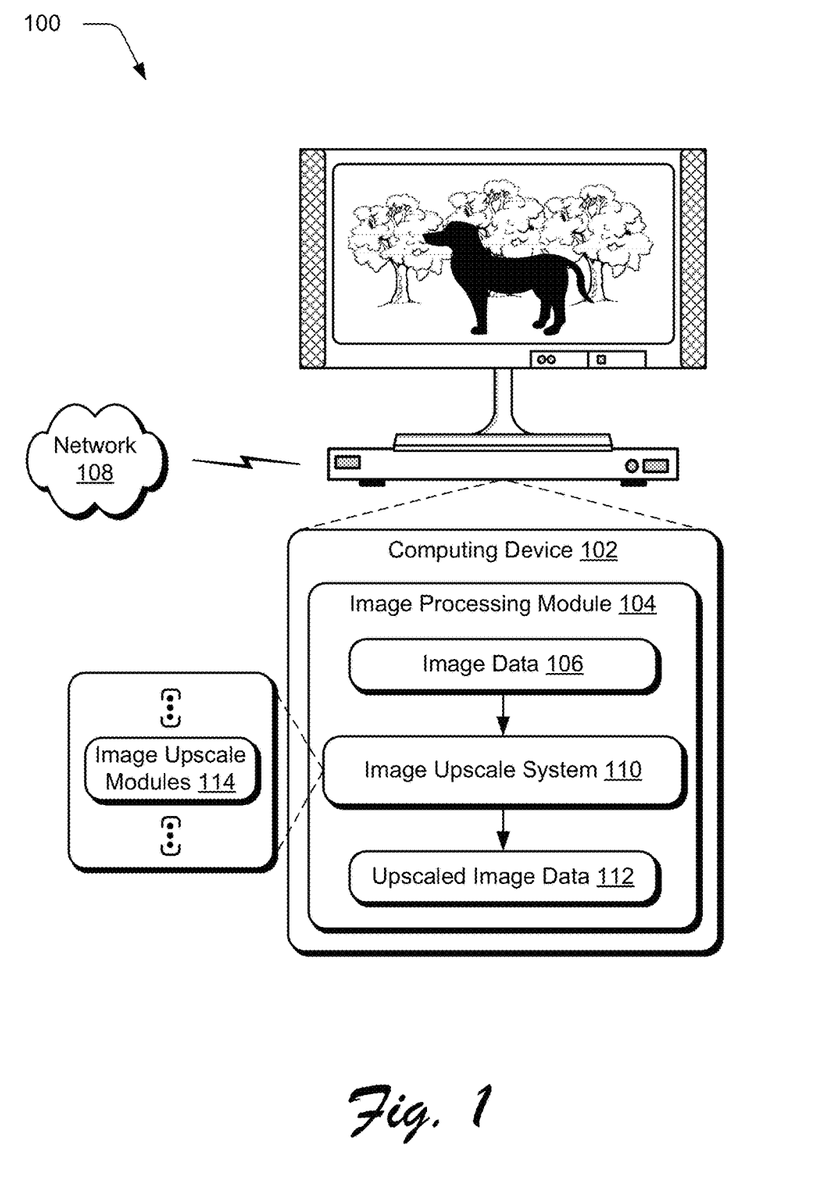
FIG. 1 is an illustration of an environment in an example implementation that is operable to employ techniques described herein.

FIG. 1 is an illustration of an environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 10.

The computing device 102 is illustrated as including an image processing module 104. The image processing module 104 is representative of functionality to process image data 106. Although illustrated as part of the computing device 102, functionality represented by the image processing module 104 may be implemented in a variety of ways, such as "over the cloud" such that this functionality is available at least partially via the network 108, through use of a distributed architecture, and so on.

The image data 106 may be obtained from a variety of different sources. This may include capture of an image scene by an image capture device such as a camera, mobile communications device (e.g., a smartphone), and so on. Image data 106 may also be created by a user, such as through creation as part of a virtual image scene and so on. Further, the image data 106 may be include as part of a sequence of images, e.g., video. Thus, the image data 106 may originate from a variety of different sources.

A variety of different functionality may be incorporated as part of the image processing module 104. An example of this functionality is an image upscale system 110. The image upscale system 110 is representative of functionality to upscale the image data 106 for form upscaled image data 112 by increasing a number of pixels used to represent the image, e.g., from "200×200" pixels of the image data 106 to "600×600" pixels of the upscaled image data 112. Thus, the upscaled image data 112 may have an increased spatial resolution in comparison with the image data 106. The upscaling of the image data 106 may be performed for a variety of different reasons, such as to increase an ability of a user to view details of the image data 106.

Figure 9:
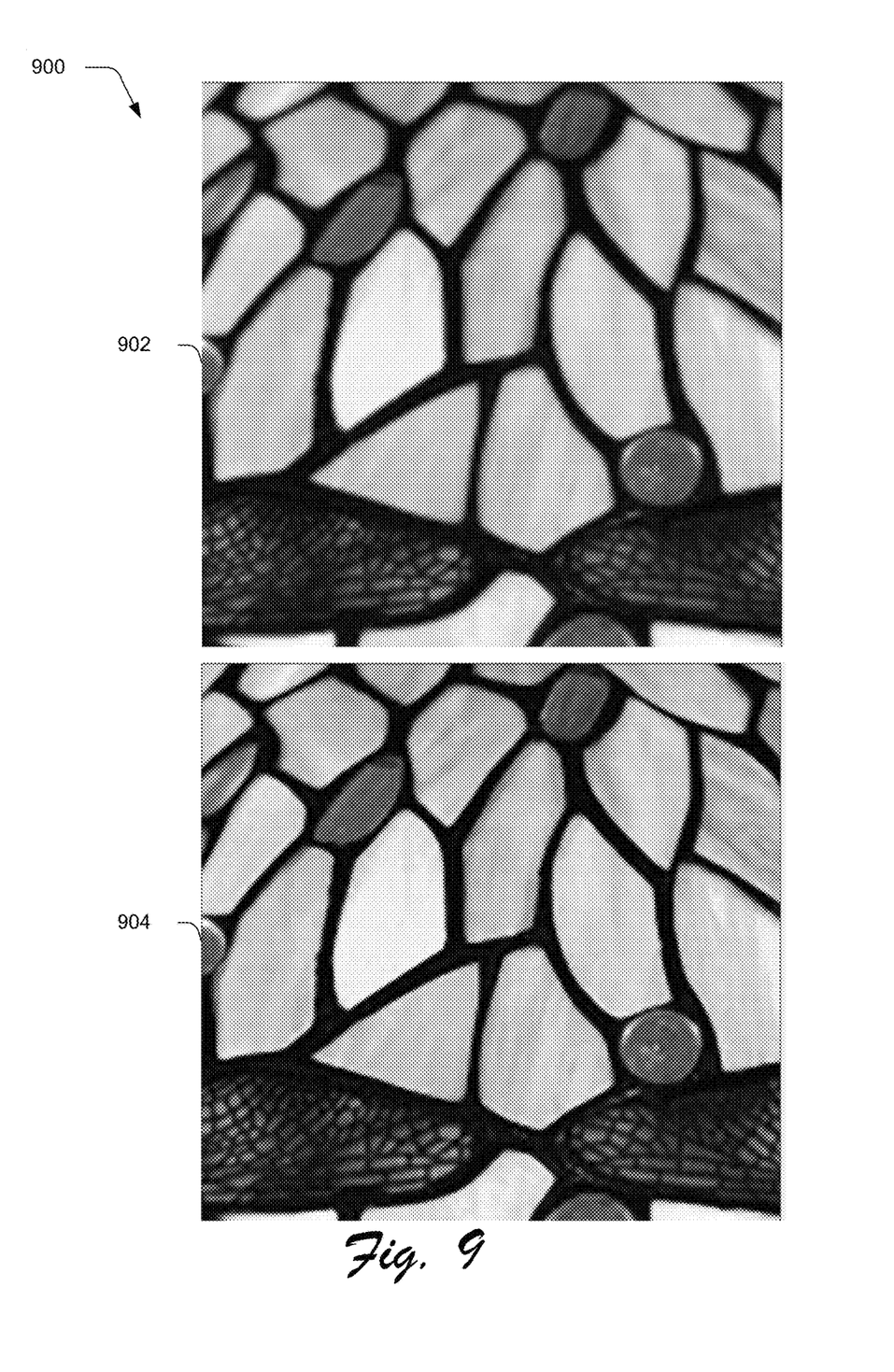
FIG. 9 includes examples of images that are upscaled using a convention technique and techniques described herein.

As previously described, however, conventional techniques that were utilized to upscale an image could result in upscaled image data having blurred edges and textures, such as through use of signal interpolation techniques such as nearest neighbor interpolation, bilinear interpolation, and so on. An example of this is shown in the image 902 in the example of FIG. 9. Thus, these conventional techniques could produce results that failed for their intended purpose in some situations, such as to increase an ability of a user to view details in the image. Accordingly, in this example the image upscale system 110 may employ one or more image upscale modules 114 that are configured to preserve image edges and texture details, an example of which is described as follows and shown in a corresponding figure as well as at the image 904 also shown in FIG. 9.

Figure 2:
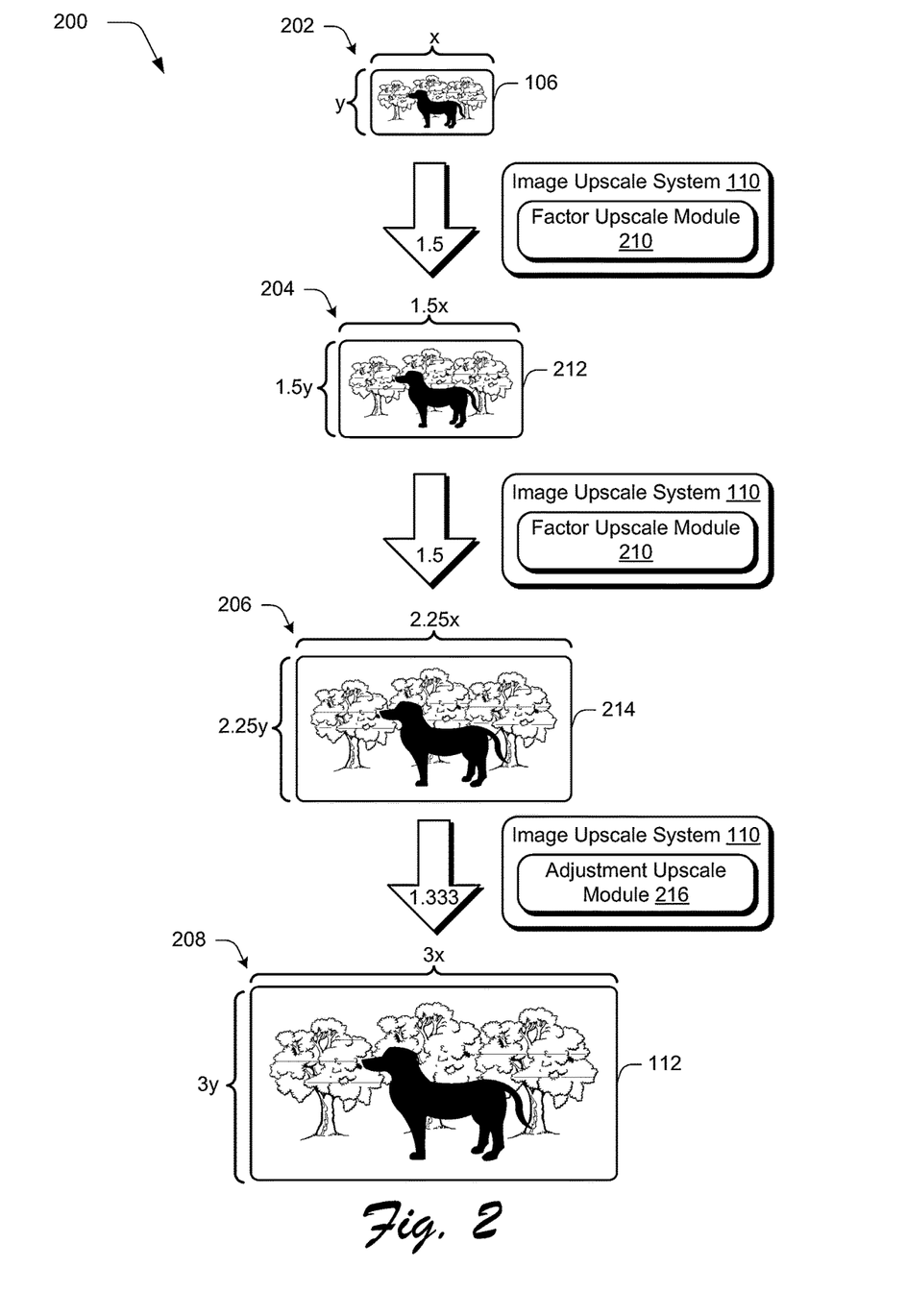
FIG. 2 depicts a system in an example implementation in which image upscale operations are shown.

FIG. 2 depicts a system 200 in an example implementation in which image upscale operations are shown. The system 200 is shown using first, second, third, and fourth stages 202, 204, 206, 208. In this example, an input is received by the image upscale system 110 to upscale the image data 106 by a factor of three such that the image data 106 includes an increased number of pixels (e.g., three times the number of pixels) that are usable to display the image. In the illustrated example, the system 200 is configured to apply set factors and then an adjustment to arrive at a desired amount of resolution increase, if applicable.

For example, to upscale image data 106 by a factor of three in both axis, e.g., "x" and "y" axis, a set factor is first applied by a factor upscale module 210, which is an example of the image upscale modules 114 of FIG. 1. The factor upscale module 210 is representative of functionality configured to apply a set factor in an upscale of image data. In the illustrated example, the set factor is "1.5" to arrive at image data 212 that is increased in both the "x" and "y" directions as shown in the second stage 204, although other examples are also contemplated.

Because the desired amount of upscale has not been reached and the remaining amount is less than the set factor, another upscale is performed at the second stage 204 by the factor upscale module 210 to arrive at a "2.25" scale of image data 214 as shown in the third stage 206.

Because the desired amount of upscale (e.g., "3") is not a power of 1.5, an adjustment upscale module 216 is employed to adjust the upscaled image 214. For instance, at the third stage 206 a desired amount of upscaling has not been reached. However, the remaining amount of upscale to be performed is less than the set factor. Accordingly, the adjustment upscale module 216 may employ another technique to utilize a non-set factor (e.g., "1.333" in this example) to arrive at the final desired amount for the upscaled image 112 as shown in the fourth stage 208, which is three in this example. In this way, the image upscale system 110 may upscale the image in an efficient manner in terms of computing device 102 resource usage to arrive at upscaled image data 112 having an increased spatial resolution. The factor upscale module 210 may be configured in a variety of different ways to perform this upscaling, an example of which is described as follows and shown in a corresponding figure.

Figure 3:
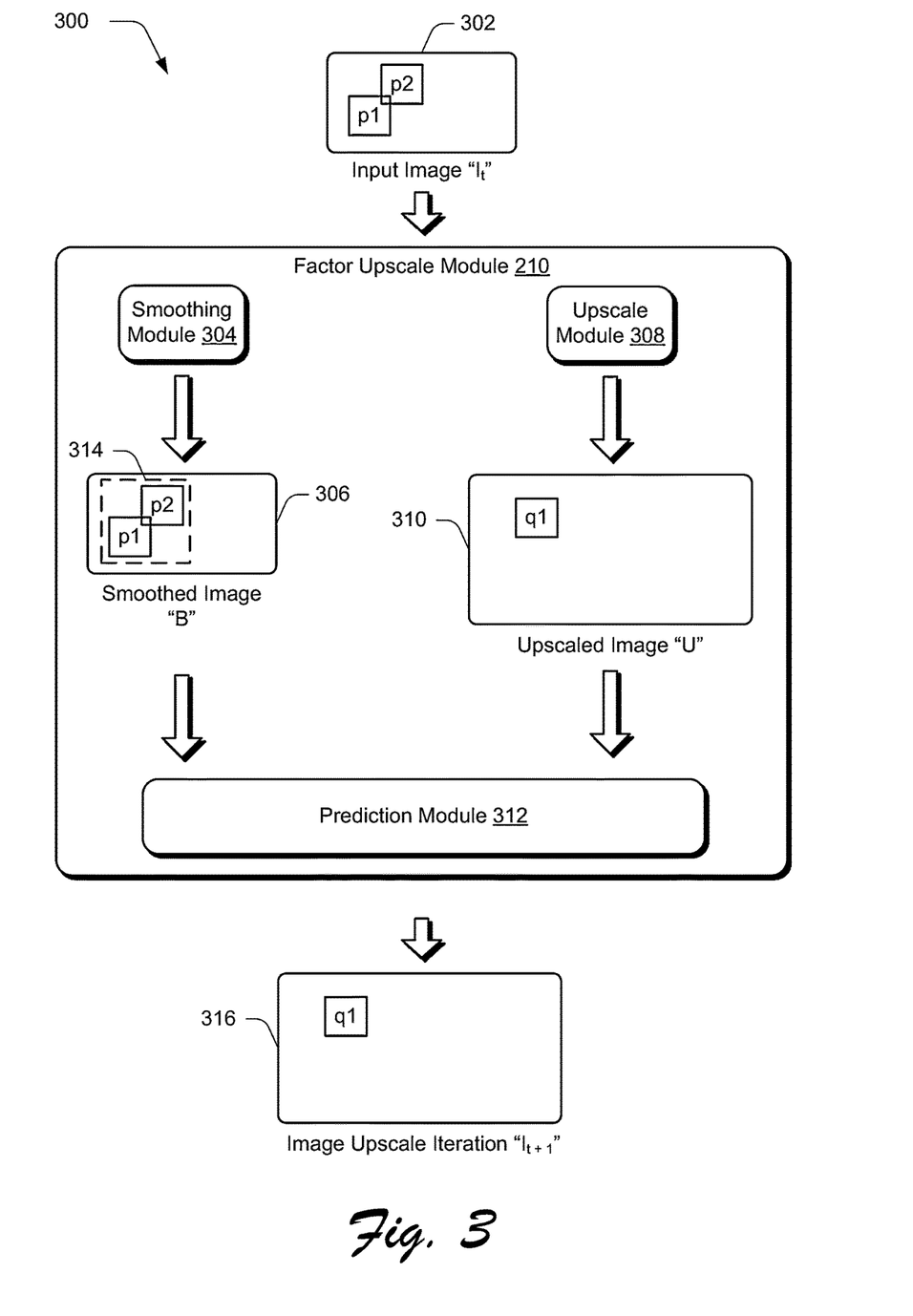
FIG. 3 is an illustration of a system configured to perform a single iteration of upscaling by a set factor using a factor upscale module of FIG. 2, the factor upscale module being shown in greater detail.

FIG. 3 is an illustration of a system 300 configured to perform a single iteration of upscaling by a set factor using a factor upscale module 210 of FIG. 2, the factor upscale module 210 being shown in greater detail. During the discussion of FIG. 3, reference will also be made to the example procedure 400 of FIG. 4. The factor upscale module 210 is illustrated as receiving an input image "$I_t$" 302, which may or may not correspond to the image data 106 described in relation to FIG. 2.

Figure 4:
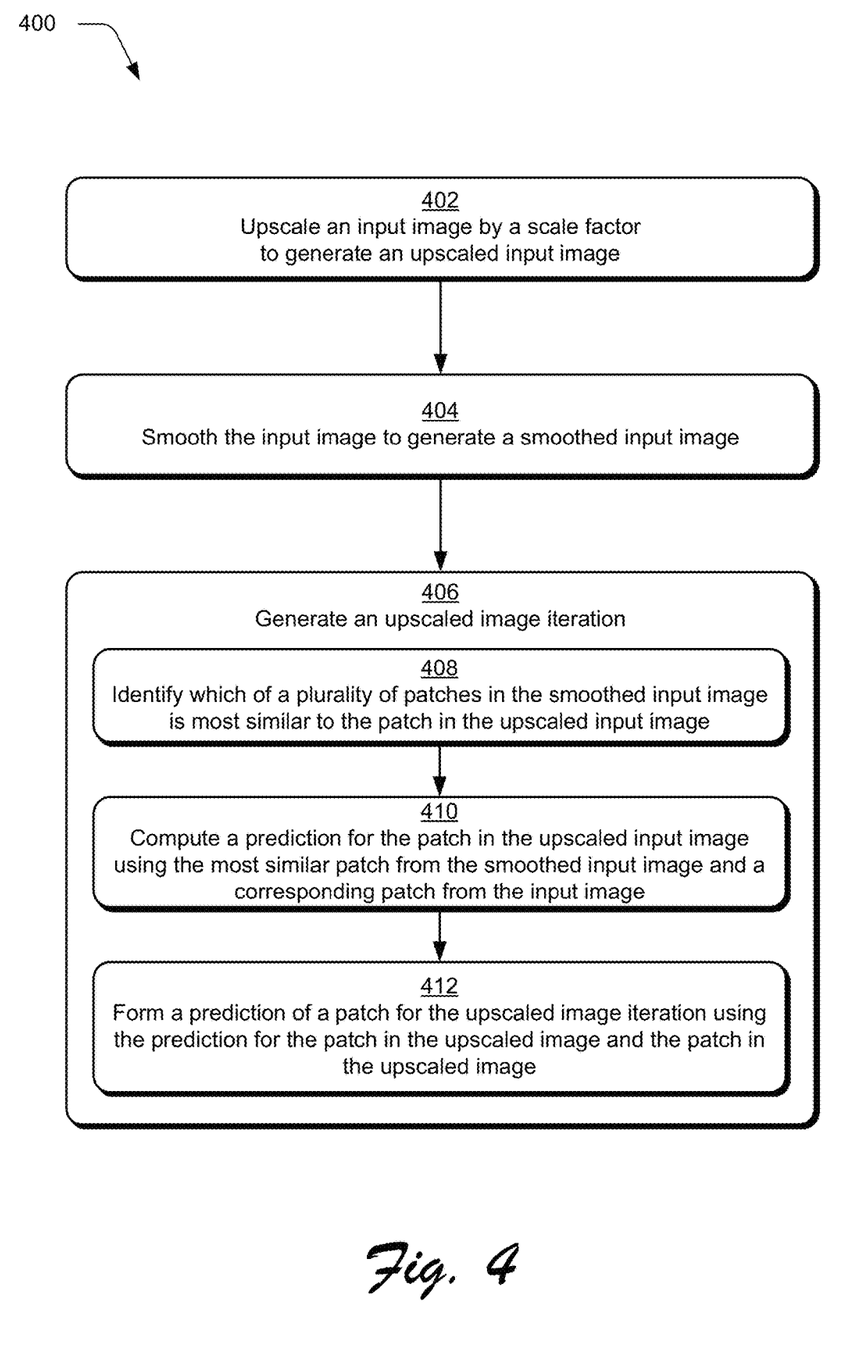
FIG. 4 is a flow diagram depicting a procedure in an example implementation in which a set factor upscale is shown.

An input image is upscaled by a scale factor to generate an upscaled input image (block 402). For example, input image "$I_t$" may be processed by an upscale module 308 to increase a resolution of the input image to obtain upscaled image "U" 310. A variety of different techniques may be employed to perform this upscaling, an example of which is Bicubic interpolation.

The input image is also smoothed to generate a smoothed input image (block 404). For example, the factor upscale module 210 includes a smoothing module 304 that is configured to smooth the input image 302 to obtain a smoothed image "B" 306, i.e., a "blurred image." A variety of different techniques may be employed to perform the smoothing, such as through use of a two-dimension Gaussian kernel "σ". In this example, the smoothed image "B" 306 has a resolution that matches a resolution of the input image 302.

An upscaled image iteration may then be generated (block 406) from these images. This may include identifying which of a plurality of patches in the smoothed input image is most similar (e.g., has the shortest image distance) to a patch in an upscaled input image (block 408). A prediction may then be computed for the patch in the upscaled input image using the most similar patch from the smoothed input image and a corresponding patch from the input image (block 410). A prediction is then formed for the upscaled image iteration using the prediction for the patch in the upscaled image and the patch in the upscaled image (block 412). This may be performed in a variety of ways.

For instance, the blurred and smoothed images may be processed by a prediction module 312 to make a prediction to upscale the input image "$I_t$" 302. The underlying approach may be based on patches, which may include predefined areas of an image, e.g., five by five pixels although other examples are also contemplated.

For example, for each patch "q1" in the upscaled image "U" 310 (which may also be denoted as "U(q1)"), a patch "p1" in the smoothed image "B" 306 is found, which may also be denoted as "B(p1)." The patch at location "p1" in the smoothed image "B" 306 is found at a corresponding location that is proportional to image size. In this way, differences in resolution between the smoothed image "B" 306 and upscaled image "U" 310 may be addressed in locating the patch. This patch may be considered the "in place" patch in the local neighborhood 314 in the smoothed image "B" 306.

A distance is then computed of patch "U(q1)" to any patch "B(p)" within a local neighborhood 314 around patch "B(p)". In this way, a patch "B(p2)" may be identified that is the most similar (i.e., closest) to patch "U(q1)," i.e., has the shortest image distance of the plurality of patches in the smoothed image "B" 306.

A high-frequency prediction of patch "U(q1)" is then computed by the prediction module 312 of the factor upscale module 210 to make a prediction used to form the image upscale iteration "$I_{t+1}$" 316. This prediction may be performed in a variety of ways. For example, a high-frequency component may first be computed in accordance with the following expression:

$$Hf(q1)=I_t(p2)-B \qquad (p2).$$

The high-frequency component is then added to the following expression, which is then used as a prediction of a patch located at "(q1)" (i.e., "$I_{t+1}$(q1)") for image upscale iteration "$I_{t+1}$" 316 by adding the predictions together:

$$U(q1):U(q1)+Hf \qquad (q1)$$

Portions of patches "$I_{t+1}$(q1)" that are overlapping may then be averaged to arrive at a result for the image upscale iteration "$I_{t+1}$" 316. This process may then be repeated to predict patches for each location of the upscaled image data. Further, as previously described in relation to FIG. 2, this technique may be repeated for a plurality of different iterations such that the image upscale iteration "$I_{t+1}$" is used as the input image "$I_t$" 302 for the next iteration.

Additional techniques may then be employed to arrive at a final desired upscale size, such as to leverage an adjustment upscale module 216 as described in relation to FIG. 2. As previously described, this is one of a variety of different examples of functionality of the factor upscale module 210 that may be employed by the image upscale system 110 to upscale image data 106. Further, the factor upscale module 210 may also employ a variety of different techniques to perform the factor upscale yet still preserve image edges and textures, examples of which may be found in relation to the following sections.

Content-Adaptive Patch Finding

Figure 5:
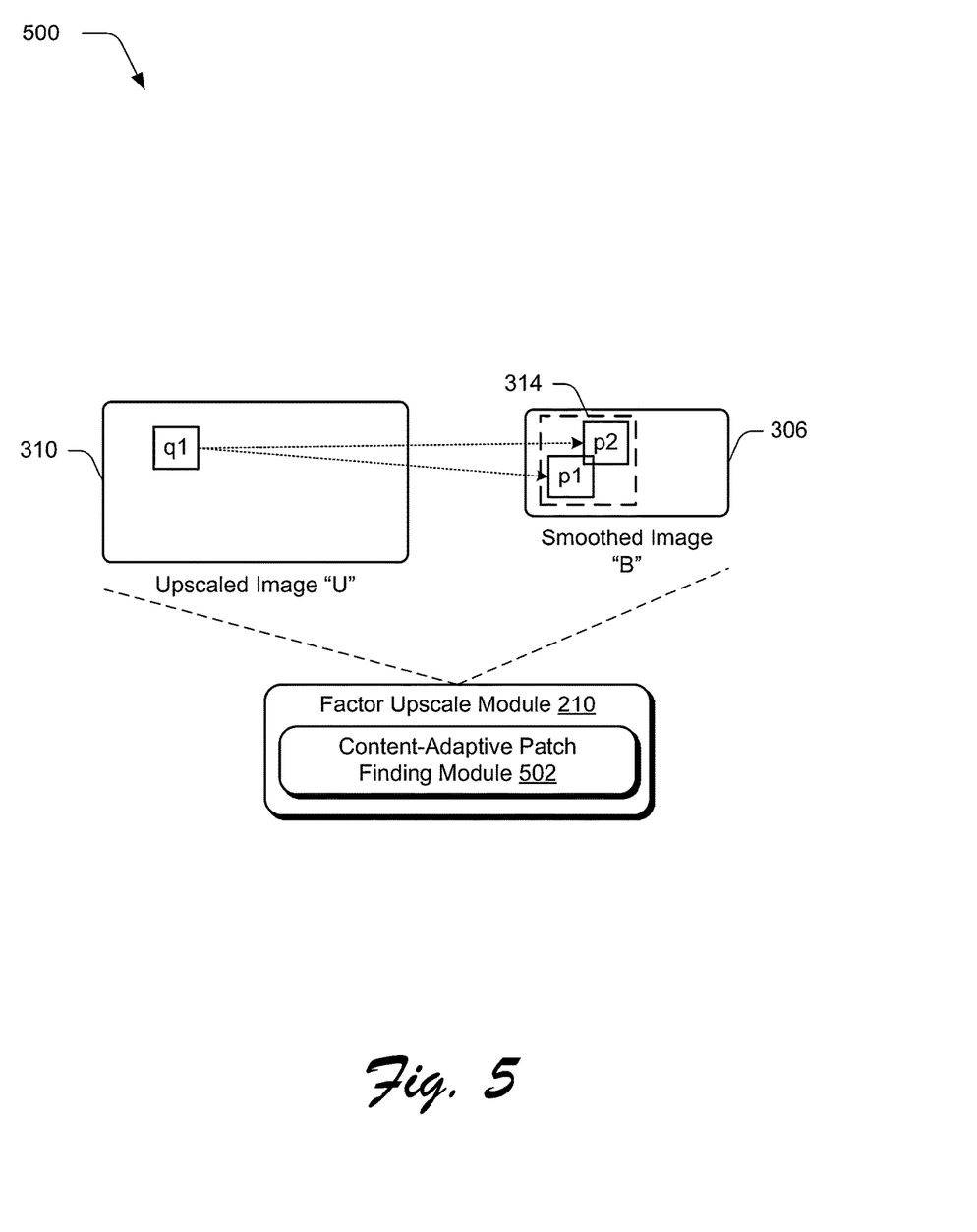
FIG. 5 depicts a system in an example implementation in which content-adaptive patch finding techniques are employed as part of the factor upscale module to upscale image data.

FIG. 5 depicts a system 500 in an example implementation in which content-adaptive patch finding techniques are employed as part of the factor upscale module to upscale image data. The following discussion of the system 500 of FIG. 5 also includes a discussion of an example procedure 600 of FIG. 6.

As shown in FIG. 5, patches at locations "p1" and "p2" in smoothed image "B" 306 are sought that are similar to a patch in upscaled imaged "U" 310 at location "q1." Accordingly, the smoothed image "B" 306 is shown having the local neighborhood 314 as previously described in relation to FIGS. 3 and 4 as well as the factor upscale module 210 as described in relation to FIGS. 1 and 2.

As previously described, conventional techniques to upscale an image may result in blurred image edges, loss of texture, and so on. In this example, however, the factor upscale module 210 employs a content-adaptive patch finding module 402. The content-adaptive patch finding module 402 is representative of functionality that may be employed to preserve structure of local contrast areas.

Figure 6:
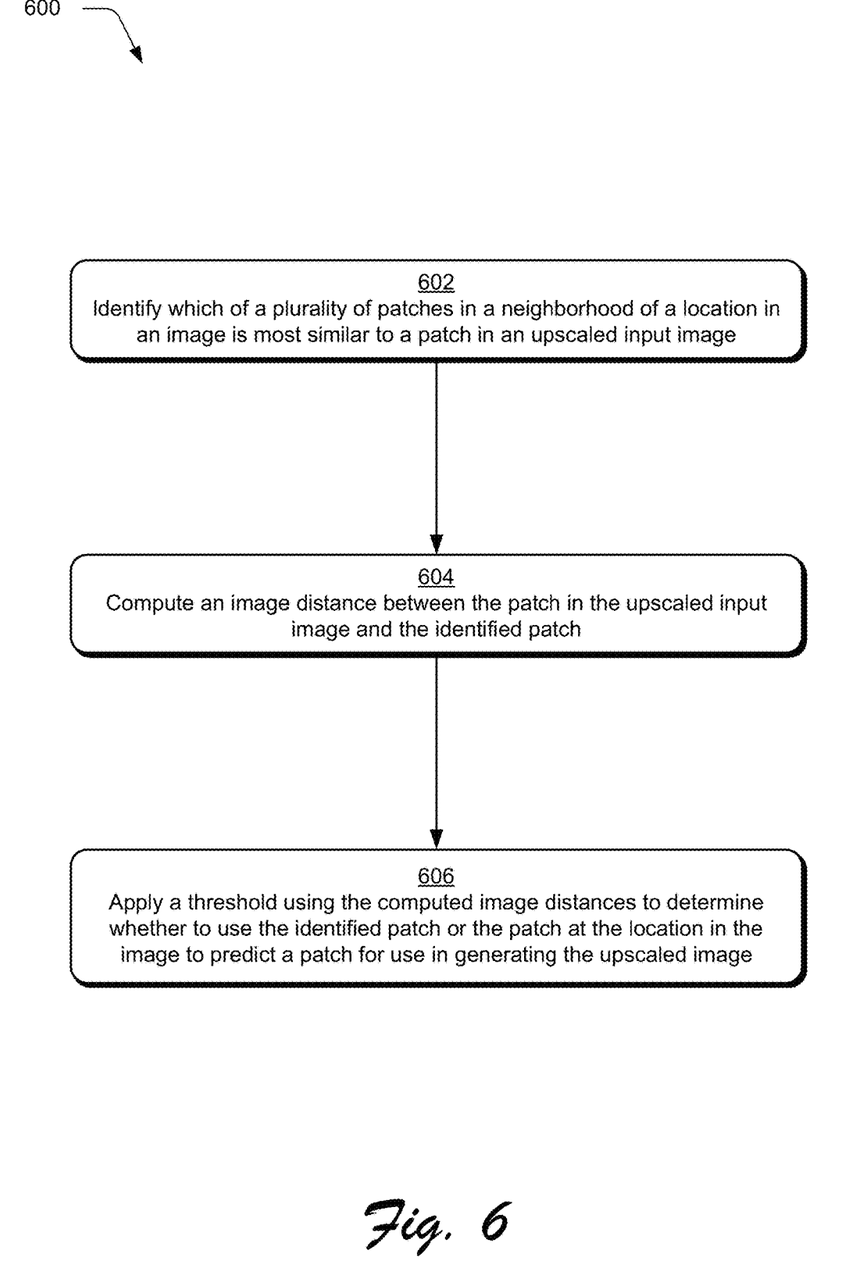
FIG. 6 is a flow diagram depicting a procedure in an example implementation in which content-adaptive patch finding techniques are shown.

As before, the factor upscale module 210 may be used to identify which of a plurality of patches in a neighborhood of a location in an image is most similar to a patch in an upscaled input image (block 602). For example, the content-adaptive patch finding module 502 of the factor upscale module 210 may be employed as part of a search for a most-similar patch in the local neighborhood 314 in smoothed image "B" 306 to patch from the upscaled image "U" 310. This similarity may be expressed as relative "image distances" between the patches and used as part of a determination as to which of the patches are to be used as part of the upscale operation. The search may be performed to give preference to a patch at an "in place" location as opposed to patches at other locations to reduce likelihood of blurred edges and texture.

The content-adaptive patch finding module 402, for instance, may estimate "p2" as the position "p" in the local neighborhood of "p1" (which is the center location), such that "|U(q1)−B(p)|" is minimized. An image distance may then be computed between the patch in the upscaled input image and the identified patch (block 604). For example, the following computation may be performed to compute the respective image distances between the patch of the upscaled image "U" 310 ("U(q1)") and patches in the smoothed image "B" 306 (("B(p1)" and "B(p2)"):

$$d_1=|U(q1)-B(p1))|, d_2=|U(q1)-B(p2)|.$$

A threshold is then applied using the computed image distances to determine whether to use the identified patch or the patch at the location in the image to predict a patch for use in generating the upscaled image (block 606). The content-adaptive patch finding module 502, for instance, may compute a ratio of these two image distances as $$"\gamma = \frac{d_2}{d_1}".$$

If the ratio $$"\gamma = \frac{d_2}{d_1}"$$

is greater than a threshold "th" (e.g., 0.5), the patch located at "p2" is updated with the patch located at "p1."

In this way, preference may be given to the "in place" patch. For instance, the threshold may be used such that an "in place" patch is used unless a patch is found such that a ratio of the image distances is closer than the threshold. In the above algorithm, the function "‖.‖" may be defined as any norms or truncated norms, with an "L2" representation used as a default. This technique may be useful in minimizing structure distortion in an upscaled result, e.g., by restricting a straight line from local distortion through preference of an "in place" patch.

Content-Adaptive Patch Update

Figure 7:
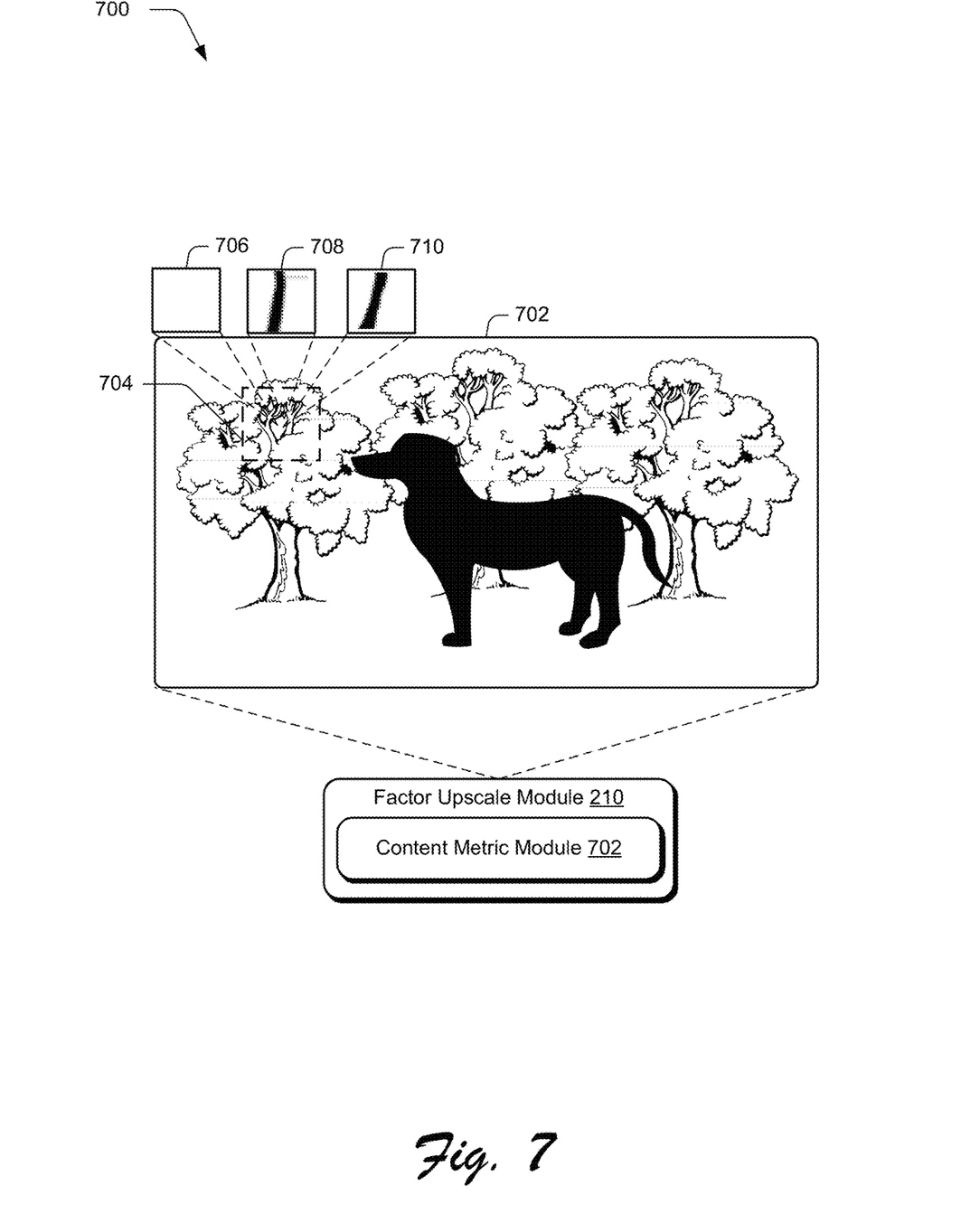
FIG. 7 depicts a system in an example implementation in which content metrics are employed as part of a search for a patch.

FIG. 7 depicts a system 700 in an example implementation in which content metrics are employed as part of a search for a patch. Like above, the discussion of FIG. 7 will also include a discussion of an example procedure 800 of FIG. 8. As before, an identification is made as to which of a plurality of patches in a neighborhood of a location in an image is most similar to a patch in an upscaled input image (block 802). For example, image data 702 may include a neighborhood 704 that is to be used to search for similar patches (i.e., patches at a relatively "close" image distance) as previously described.

Given an image patch, a content metric "R" may be computed for the patch. This functionality is represented as a content metric module 702 in the system 700. The illustrated neighborhood 704 includes a plurality of patches 706, 708, 710 that are processed by the content metric module 702 to distinguish between the content of the patches. The content metric may describe consistency of gradient orientations to distinguish informative local patches (such as edges and corners) versus uniform or noisy patches.

Figure 8:
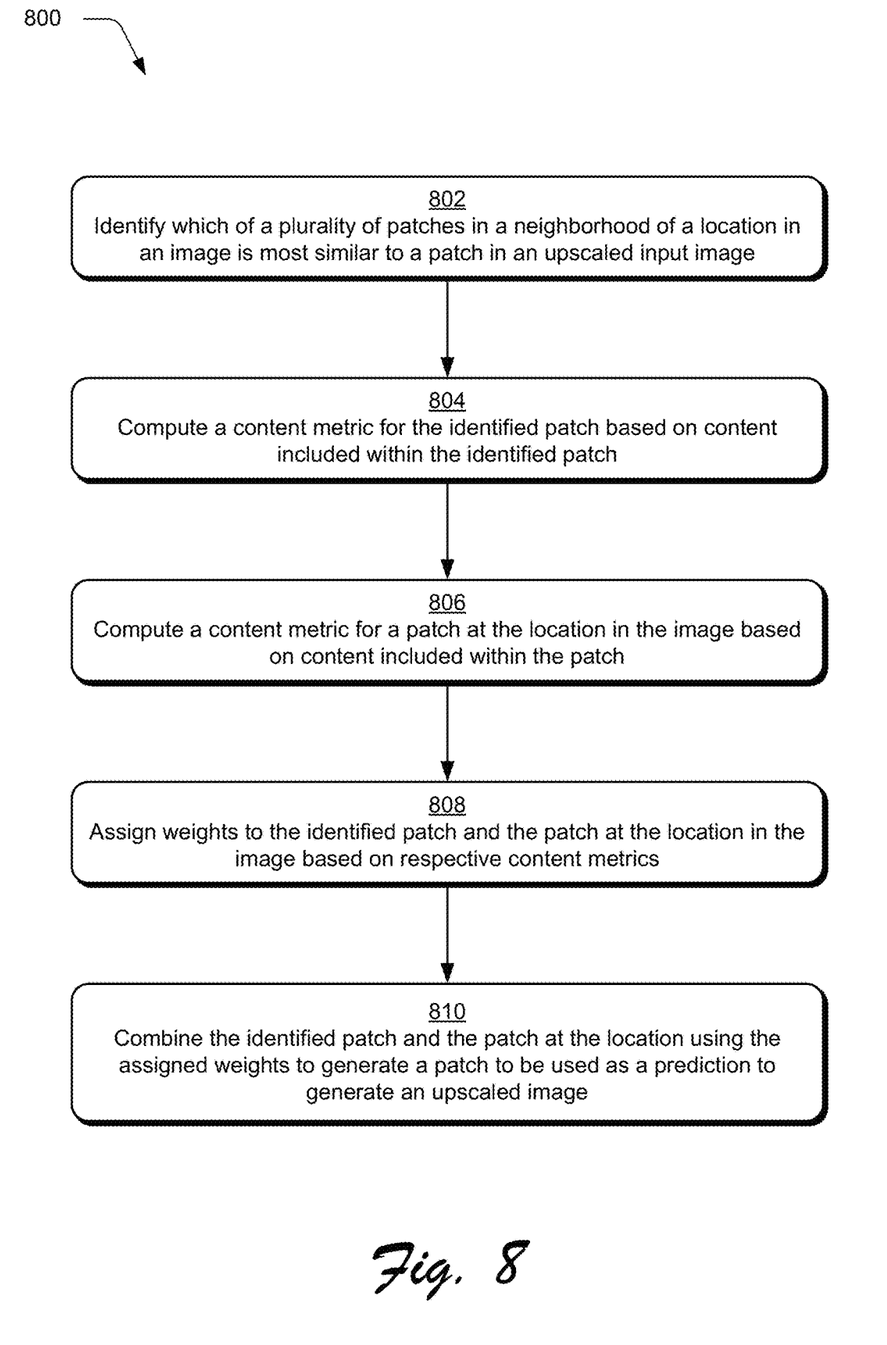
FIG. 8 is a flow diagram depicting a procedure in an example implementation in which content metric techniques are shown.

In the illustrated instance, the content metric module 702 may be used to compute a content metric for patch 706 that indicates that content of the patch is uniform and thus has a low "R" value whereas content for patches 708, 710 includes consistent gradient orientations and thus has relatively high "R" values. In this way, content metrics may be computed for an "in-place" patch at a location within the image as above as well as for the "most similar" patch that was identified within the neighborhood of the in-place patch (blocks 804, 806).

Weights are then assigned to the identified patch (i.e., the most similar patch) and the patch at the location in the image (i.e., the in-place patch) based on respective content metrics (block 808). In one or more implementations, the higher the value of "R," the more reliance may be given (e.g., increased weight "β") to the most similar patch in appearance for computing a high frequency component, while the smaller the value, greater reliance is given to the in-place patch (e.g., less weight "β"). In other words, increased reliance is given to in place patches in situations of noise or uniform content whereas decreased reliance may be given in instances in which the patches are considered "informative." Thus, artifacts may be avoided from use of relatively noisy patches.

In this way, the identified patch and the patch at the location may be combined using the assigned weights to generate a patch to be used as a prediction to generate an upscaled image (block 810). For example, weights may be assigned for positions "p1" and "p2," i.e., "β" and "1−β," respectively. The weights may be designed as a function of "R:β=h(R)" or "β=h(R,γ)." Then, the high frequency component may be computed according to the following expression:

$$Hf(q1)=\beta^*(I_t(p2)-B(p2))+(1-\beta)^*(I_tp1)-B(p1)).$$

Thus, in this example rather than use one patch or the other patch, weights may be employed to utilize a combination of the patches. In one or more implementations, the weight parameter "β" is set to "β=(min(R+0.2, 1.0))²" to encourage sharper results for larger "R" while avoiding artifact boosting on texture areas, such as portions of an image that include hair, grass, and so forth. Further, the ratio described in the previous section may also utilized in the calculation of the weight parameter "β". For example, image distance ratios may be computed with a function to compute "β" such that the larger the "R" value the larger the value of "β."

Iteration-Adaptive Parameter Update

Referring back to FIG. 2, the techniques described herein may be more effective in early iterations, and less effective at later iterations that have more computational cost. Accordingly, the image upscale system 110 may be configured to adaptively limit a number of iterations performed by the factor upscale module 210, and then use an adjustment upscale module 216 (e.g., analytical interpolation) to resize the output of the factor upscale module 210 to the target image size of the upscaled image data 112. In such a way, efficiency of the image upscale system 110 may be increased (e.g., in terms of computational resources and time spent performing the processing) with little compromise on the final image quality. This may be performed in a variety of ways.

For example, the image upscale system 110 may be configured to limit the factor upscale module 210 to performance of a maximum number of iterations, e.g., $T_{max}$ (e.g., $T_{max}=5$) iterations. Thus, as before any resizing after the performance of these iterations by the factor upscale module 210 may be performed by the adjustment upscale module 216.

Additionally, the image upscale system 110 may be configured to cause the factor upscale module 210 to perform a minimum number of iterations, i.e., at least $T_{min}$ (e.g., $T_{min}=2$) iterations. This may be performed by setting a factor used by the factor upscale module 210 to perform at least the minimum number of iterations, "downscaling" of an output of the factor upscale module 210 by the adjustment upscale module 216, and so on.

Further, the image upscale system 110 may be configured to cease performance of the iterations if the image size would exceed a threshold. For example, an expression "w×h>M" may be employed where "w" and "h" are the width and height of the input image for current iteration and "M" is the threshold.

Additionally, the upscale techniques may be performed on overlapping patches with patch sampling step size "t", e.g., t=1 means a single patch is sampled for each pixel of the image. The patch sampling step size describes an amount a patch is moved to form another patch to be sampled. Accordingly, the patch step size "t" may be adapted with an iteration index to speed up performance of the technique by the computing device 102. Using smaller step sizes in early iterations and larger step sizes (e.g., t=3) in later iterations typically does not have an appreciable effect on the quality of the result and may increase speed of performance of the upscale techniques.

For example, for a "5×5" patch, moving the patch one pixel for each iteration (such that each pixel is included in 25 different patches) rather than three pixels for each iteration (such that the pixel is included in a fewer number of patches) may have in increased computational cost. Therefore, adaptions applied to the sampling step size may be used to increase efficiency and retain desired accuracy. Other examples are also contemplated without departing from the spirit and scope thereof.

Additionally, variations to the techniques may be made to address different color spaces and color channels. For example, the upscale techniques employed by the image upscale system 110 may be applied to a luminance channel "Y," and the result may be combined with different algorithms applied to the "Cb" and "Cr" color channels. This may be performed after conversion of an image from an "RGB" color space. In another example, the upscale techniques may be applied to each color channel (e.g., color space) separately, e.g., may be applied independently to red, green, and blue color channels.

In a further example, the upscale techniques may be applied to one or multiple color channels jointly. This may be performed by searching for the nearest patches in each of the color spaces and applying upscaling consistently for different color spaces using the patch search results.

In yet another example, for non-uniform upscaling factors (e.g., "s1," "s2"), the uniform upscaling scheme described in relation to FIG. 2 may be applied to reach a size similar to the larger value between "s1" and "s2." The result may then be adjusted to achieve a desired target size, e.g., by using analytic interpolation methods.

Yet further, at each iteration performed by the factor upscale module 210, a detail-preserving upscaling algorithm may be employed to upscale its input by a factor of "s." If the original image is noisy, for instance, an image denoising algorithm may be applied before the upscaling iterations to suppress noise boosting. Additionally, in the initial denoising step, the search region may be adapted by setting its radius proportional to the input denoising parameter to speed-up the process for images with relatively small amounts of noise.

In a further example, variations may be made for setting algorithm parameters. For example, a scale factor "s" may be set differently over iterations, e.g. increasing "s" over iterations in the range of 1:1 to 1:5.

As previously described, the image data 106 may also be part of a video. Accordingly, for video upscaling, the techniques may be applied to each image independently, and the results combined to generate the upscaled video. In another example, the techniques may be applied to videos by applying the patch search step to multiple images (e.g., searching similar patch from multiple nearby frames) for improving accuracy of upscaling. Additionally, multi-frame denoising may be applied first to ensure the temporal coherency of the de-noised result, and then the proposed upscale techniques may be applied independently to each frame. A variety of other examples are also contemplated as further described above.

Example System and Device

Figure 10:
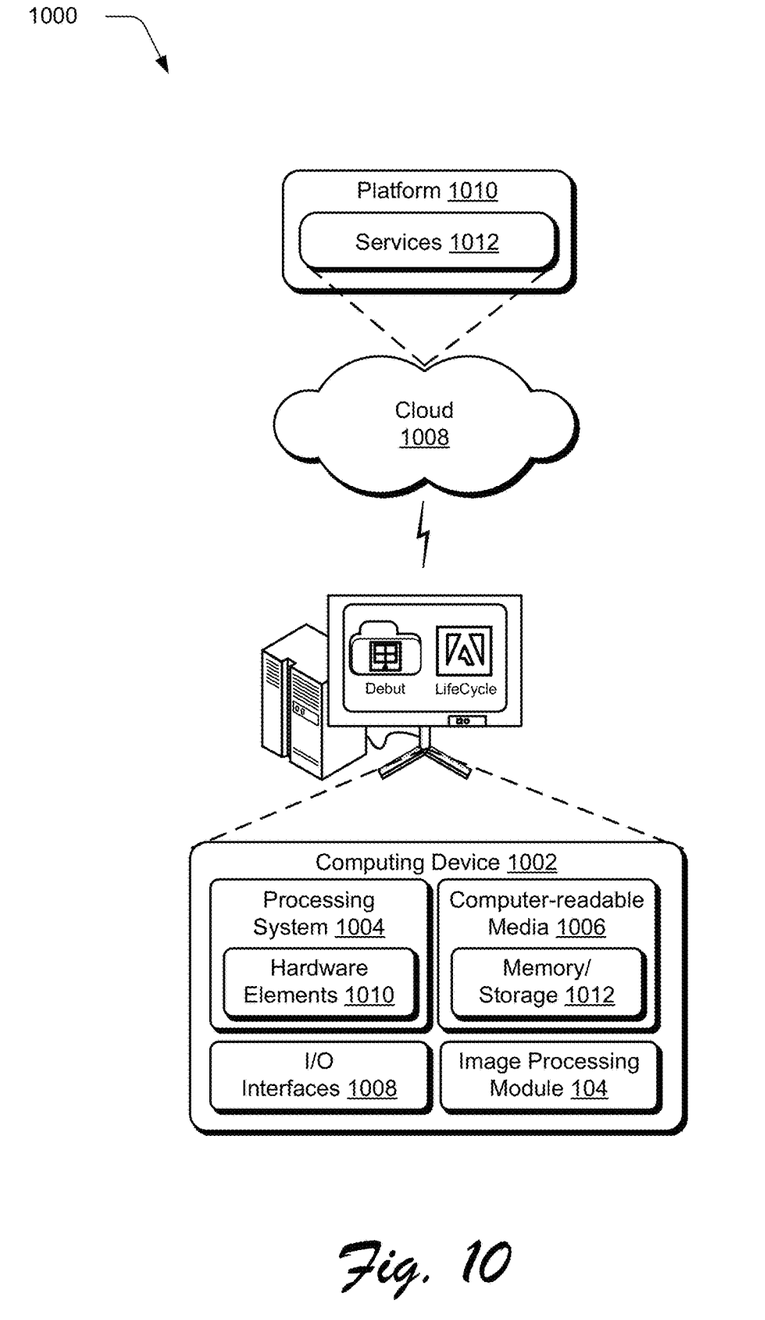
FIG. 10 illustrates an example system including various components of an example device that can be implemented as any type of computing device as described and/or utilize with reference to FIGS. 1-9 to implement embodiments of the techniques described herein.

FIG. 10 illustrates an example system generally at 1000 that includes an example computing device 1002 that is representative of one or more computing systems and/or devices that may implement the various techniques described herein. This is illustrated through inclusion of the image processing module 104, which may be configured to process image data. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A method comprising:
   iteratively upscaling an input image using a scale factor in which each iteration of the upscaling is performed using overlapping patches formed using a patch sampling step size, the patch sampling step size being an amount a patch is moved to form another patch to be sampled, the iteratively upscaling including:

upscaling the input image by the scale factor to generate an upscaled input image;
smoothing the input image to generate a smoothed input image; and
generating an upscaled image iteration comprising, for each patch in the upscaled input image:
identifying which of a plurality of patches in the smoothed input image is most similar to the patch in the upscaled input image by:
identifying an in-place patch in the smoothed input image at a corresponding location that is proportional to a difference in image size between the upscaled input image and the smoothed input image;
computing an image distance of the patch in the upscaled input image to the plurality of patches in the smoothed input image, the plurality of patches included within a neighborhood of the in-place patch; and
locating the most similar patch from the plurality of patches based on the computed image distances;
computing a prediction for the patch in the upscaled input image using the most similar patch from the smoothed input image or the in-place patch based on comparing a ratio of the computed image distances to a threshold, and a corresponding patch from the input image; and
forming a prediction of a patch for the upscaled image iteration using the prediction for the patch in the upscaled image and the patch in the upscaled image;
adapting the patch sampling step size such that the patch sampling step size for a first said iteration is different than a patch sampling step size for a second said iteration; and
adaptively limiting a number of iterations of said iteratively upscaling by setting a minimum number of iterations and a maximum number of iterations, different from the minimum number of iterations, and enforcing the number of iterations to be within the minimum number of iterations and the maximum number of iterations.

2. A method as described in claim 1, further comprising adjusting a result of the iterative upscaling of the input image to change a spatial resolution of the result using an image scaling technique that is different than a technique used to perform the iterative upscaling.

3. A method as described in claim 1, wherein the computing of the prediction for the patch in the upscaled input image includes subtracting the most similar patch from the smoothed input image from the corresponding patch from the input image.

4. A method as described in claim 1, wherein the forming of the prediction of the patch for the upscaled image iteration includes adding the prediction for the patch in the upscaled input image to the patch in the upscaled input image.

5. A method as described in claim 1, wherein the upscaling includes applying Bicubic interpolation and the smoothing includes using a Gaussian kernel.

6. The method of claim 1, the patch sampling step size being a number of pixels.

7. The method of claim 1, the patch sampling step size being smaller in early iterations and larger in later iterations.

8. A system comprising:
one or more processors; and
one or more tangible computer-readable media having stored thereon computer-executable instructions that are executable by the one or more processors to perform operations including:
iteratively upscaling an input image using a scale factor in which each iteration of the upscaling is performed using overlapping patches formed using a patch sampling step size until a remaining non-zero amount of upscale is less than the scale factor, the patch sampling step size being an amount a patch is moved to form another patch to be sampled, the iteratively upscaling including:
upscaling the input image by the scale factor to generate an upscaled input image;
smoothing the input image to generate a smoothed input image; and
generating an upscaled image iteration comprising, for each patch in the upscaled input image:
identifying which of a plurality of patches in the smoothed input image is most similar to the patch in the upscaled input image by:
identifying an in-place patch in the smoothed input image at a corresponding location that is proportional to a difference in image size between the upscaled input image and the smoothed input image;
computing an image distance of the patch in the upscaled input image to the plurality of patches in the smoothed input image, the plurality of patches included within a neighborhood of the in-place patch; and
locating the most similar patch from the plurality of patches based on the computed image distances;
computing a prediction for the patch in the upscaled input image using the most similar patch from the smoothed input image or the in-place patch based on comparing a ratio of the computed image distances to a threshold, and a corresponding patch from the input image; and
forming a prediction of a patch for the upscaled image iteration using the prediction for the patch in the upscaled image and the patch in the upscaled image; and
adapting the patch sampling step size such that the patch sampling step size for a first said iteration is different than a patch sampling step size for a second said iteration.

9. The system of claim 8, further comprising adjusting a result of the iterative upscaling of the input image to change a spatial resolution of the result using an image scaling technique that is different than a technique used to perform the iterative upscaling.

10. The system of claim 8, wherein the computing of the prediction for the patch in the upscaled input image includes subtracting the most similar patch from the smoothed input image from the corresponding patch from the input image.

11. The system of claim 8, wherein the forming of the prediction of the patch for the upscaled image iteration includes adding the prediction for the patch in the upscaled input image to the patch in the upscaled input image.

12. The system of claim 8, wherein the upscaling includes applying Bicubic interpolation and the smoothing includes using a Gaussian kernel.

13. The system of claim 8, the patch sampling step size being a number of pixels.

14. The system of claim 8, the patch sampling step size being smaller in early iterations and larger in later iterations.

15. A non-transitory computer-readable storage medium storing program instructions, wherein the program instructions are computer-executable to implement:
- iteratively upscaling an input image using a scale factor in which each iteration of the upscaling is performed using overlapping patches formed using a patch sampling step size until a remaining non-zero amount of upscale is less than the scale factor, the patch sampling step size being an amount a patch is moved to form another patch to be sampled, the iteratively upscaling including:
  - upscaling the input image by the scale factor to generate an upscaled input image;
  - smoothing the input image to generate a smoothed input image; and
  - generating an upscaled image iteration comprising, for each patch in the upscaled input image:
    - identifying which of a plurality of patches in the smoothed input image is most similar to the patch in the upscaled input image by:
      - identifying an in-place patch in the smoothed input image at a corresponding location that is proportional to a difference in image size between the upscaled input image and the smoothed input image;
      - computing an image distance of the patch in the upscaled input image to the plurality of patches in the smoothed input image, the plurality of patches included within a neighborhood of the in-place patch; and
      - locating the most similar patch from the plurality of patches based on the computed image distances;
    - computing a prediction for the patch in the upscaled input image using the most similar patch from the smoothed input image or the in-place patch based on comparing a ratio of the computed image distances to a threshold, and a corresponding patch from the input image; and
    - forming a prediction of a patch for the upscaled image iteration using the prediction for the patch in the upscaled image and the patch in the upscaled image; and
- adapting the patch sampling step size such that the patch sampling step size for a first said iteration is different than a patch sampling step size for a second said iteration.

16. The non-transitory computer-readable storage medium of claim 15, wherein the computing of the prediction for the patch in the upscaled input image includes subtracting the most similar patch from the smoothed input image from the corresponding patch from the input image.

17. The non-transitory computer-readable storage medium of claim 15, wherein the forming of the prediction of the patch for the upscaled image iteration includes adding the prediction for the patch in the upscaled input image to the patch in the upscaled input image.

18. The non-transitory computer-readable storage medium of claim 15, wherein the upscaling includes applying Bicubic interpolation and the smoothing includes using a Gaussian kernel.

19. The non-transitory computer-readable storage medium of claim 15, the patch sampling step size being a number of pixels.

20. The non-transitory computer-readable storage medium of claim 15, the patch sampling step size being smaller in early iterations and larger in later iterations.

* * * * *